W. A. SEEK.
FRICTION HOLDER.
APPLICATION FILED APR. 1, 1918.

1,362,641.

Patented Dec. 21, 1920.

INVENTOR
William A. Seek
By Carl Strover
ATTY

UNITED STATES PATENT OFFICE.

WILLIAM A. SEEK, OF CHICAGO, ILLINOIS.

FRICTION-HOLDER.

1,362,641.	Specification of Letters Patent.	Patented Dec. 21, 1920.

Application filed April 1, 1918. Serial No. 226,009.

*To all whom it may concern:*

Be it known that I, WILLIAM A. SEEK, a citizen of the United States, residing in the city of Chicago, county of Cook, State of Illinois, have invented a certain new and Improved Friction-Holder, of which the following is a specification.

The object of my invention is to provide an inexpensive and durable device particularly adapted to hold a door or window in any desired position, but applicable also to other similar uses. A further object of my device is to provide a holder which allows of the utmost movement of a door, without being in the way; is adjustable to different degrees of tension; and occupies but small space.

Figure 1:
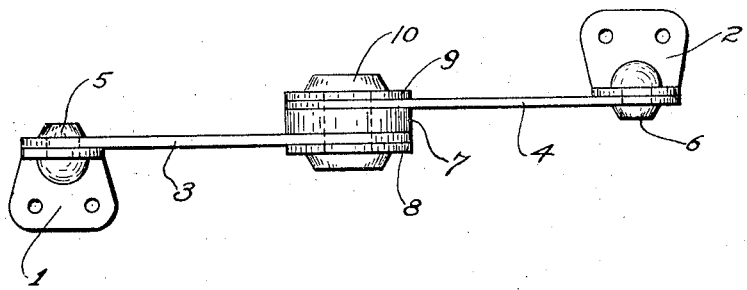
Figure 1:
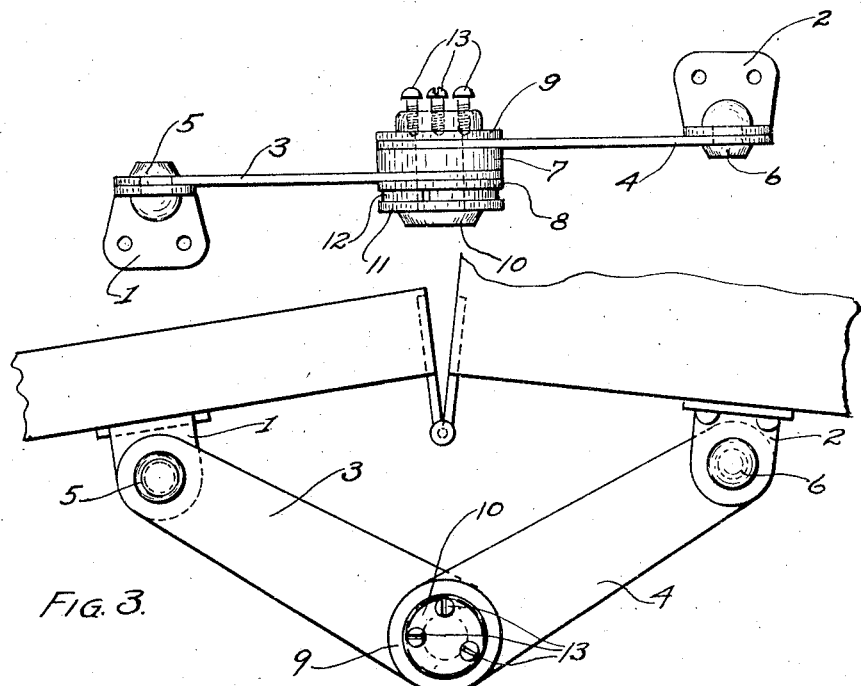

The drawing shows perspective views of my holder, Figures 1 and 2 showing two different constructions of my device; and Fig. 3 showing a top view of the holder shown in Fig. 2, attached to a door-frame and door.

Referring to the drawing, 1 and 2 are brackets attachable to a door frame and a door, hung in such frame, respectively. To brackets 1 and 2 are oscillatably attached, in the manner shown by the drawing, by rivets 5 and 6, preferably flat members 3 and 4, respectively, the outer ends of which are oscillatably joined together by a preferably large-headed rivet 10, washers 8 and 9 being preferably interposed between the heads of rivet 10, and members 3 and 4, respectively. An additional washer 7 is preferably interposed between members 3 and 4. If this washer 7 is made, as shown in Fig. 1, of elastic fiber and the rivet heads are driven down tight on the joint thus formed, a fairly durable friction-holder will result, suitable for places where there is not very frequent movement of the joint, or where the use is only temporary. By hammering down on the rivet from time to time my holder, thus constructed, can be kept in serviceable condition for a long period. For harder usage, longer wear and superior adjustability I prefer to make all three washers 7, 8 and 9 of metal, and to interpose between one of the heads of rivet 10, and the adjoining washer (8) an additional washer 11 and a split tension-washer 12, and to enter into the opposite head of rivet 10 one or more, preferably three, set screws 13 the points of which bear on the adjoining washer (9), said washer preferably being provided with depressions adapted to receive the points of the set-screws; it being of course also quite feasible to use the split tension-washer 12 without set-screws 13.

It is evident that the construction shown for the joint held together by rivet 10, might be used for either or both of the joints held together by rivets 5 and 6, and thereby a similar effect be realized.

It is manifest also that in many other details the construction of my device may be changed, and that it may readily be adapted to numerous uses, without departing from the essential features of my invention. All such changes and adaptations I intend to cover.

I claim:—

In a friction-holder, the combination of brackets; folding members oscillatably joined to the brackets and to each other by rivets; a tension-washer surrounding one of the rivets; a multiplicity of set-screws entered into one of the heads of such rivet; and a washer surrounding such rivet, and provided with depressions adapted to receive the points of the set-screws; for the purpose described.

WILLIAM A. SEEK.

Witnesses:
HENRY E. SCHULZE,
C. W. EISL.